United States Patent
Froeschle et al.

(10) Patent No.: US 8,172,307 B2
(45) Date of Patent: May 8, 2012

(54) MOTOR VEHICLE AND REAR DECK LID FOR A MOTOR VEHICLE

(75) Inventors: Mathias Froeschle, Ostfildern (DE); Grant Larson, Ludwigsburg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 173 days.

(21) Appl. No.: 12/789,979

(22) Filed: May 28, 2010

(65) Prior Publication Data

US 2011/0001329 A1  Jan. 6, 2011

(30) Foreign Application Priority Data

Jul. 1, 2009 (DE) .......................... 10 2009 031 250

(51) Int. Cl.
*B62D 37/02* (2006.01)
(52) U.S. Cl. .......... 296/180.1; 296/76; 296/91; 180/903
(58) Field of Classification Search ............... 296/76, 296/91, 180.1, 180.2, 180.3, 180.4, 180.5; 180/903; 454/187

See application file for complete search history.

(56) References Cited

U.S. PATENT DOCUMENTS

| | | | |
|---|---|---|---|
| 2,933,344 A | 4/1960 | Shumaker | |
| 3,072,431 A | 1/1963 | Shumaker | |
| 3,425,741 A * | 2/1969 | Korff .......................... | 296/180.1 |
| 3,606,444 A * | 9/1971 | Allenbaugh ................ | 296/180.1 |
| 4,160,494 A * | 7/1979 | McCambridge .............. | 188/270 |
| 4,184,713 A | 1/1980 | Matsui et al. | |
| 4,257,640 A * | 3/1981 | Wiley .......................... | 296/180.3 |
| 4,267,895 A | 5/1981 | Eggert, Jr. | |
| 4,275,915 A | 6/1981 | Koritnik | |
| 4,465,154 A * | 8/1984 | Hinderks ...................... | 180/89.2 |
| 5,678,884 A | 10/1997 | Murkett et al. | |
| 5,923,245 A * | 7/1999 | Klatt et al. .................... | 340/479 |
| 5,966,845 A * | 10/1999 | DiGiacomo .................... | 37/231 |
| 6,230,836 B1 * | 5/2001 | Cowan et al. ................ | 180/118 |
| 2004/0238246 A1 | 12/2004 | Ceccarani et al. | |
| 2005/0184544 A1 | 8/2005 | Iverson et al. | |
| 2010/0194144 A1 * | 8/2010 | Sinha .......................... | 296/180.2 |
| 2011/0000727 A1 * | 1/2011 | Froeschle et al. ............. | 180/68.1 |
| 2011/0001329 A1 * | 1/2011 | Froeschle et al. ............. | 296/76 |

FOREIGN PATENT DOCUMENTS

| | | |
|---|---|---|
| DE | 30 17 919 | 11/1980 |
| DE | 40 26 518 | 3/1991 |
| DE | 19817382 A1 | 10/1998 |
| DE | 19806610 | 8/1999 |
| DE | 101 43 867 | 3/2003 |
| FR | 2 575 127 | 6/1986 |
| GB | 2142287 | 7/1983 |

* cited by examiner

*Primary Examiner* — Lori Lyjak
(74) *Attorney, Agent, or Firm* — Gerald E. Hespos; Michael J. Porco

(57) ABSTRACT

A motor vehicle (2) has a roof (3) with two laterally spaced longitudinal roof members (4, 5) and side windows (9) under the longitudinal roof members (4, 5). Fins (4, 5) extend rearward from the longitudinal roof members (4, 5) and an outer skin (16) of a rear deck lid (17) is arranged between the fins (12, 13). Air inlet openings (20, 21) are formed on outer sides (14) of the fins (12, 13) adjacent the side windows (9). An air duct (23, 24) extends from the air inlet opening (20, 21) to an air outlet opening (25, 26) on the inner side (15) of the fin (12, 13). The outer skin (16) has at least one supply air inlet (28, 29) for an assembly of the motor vehicle (2) and a rear air deflection device (32) is arranged behind the supply air inlet (28, 29).

15 Claims, 3 Drawing Sheets

MOTOR VEHICLE AND REAR DECK LID FOR A MOTOR VEHICLE

CROSS-REFERENCE TO RELATED APPLICATIONS

This application claims priority under 35 USC 119 to German Patent Application No. 10 2009 031 250.1 filed on Jul. 1, 2009, the entire disclosure of which is incorporated herein by reference.

BACKGROUND OF THE INVENTION

1. Field of the Invention

The invention relates to a motor vehicle with a rear deck lid.

2. Description of the Related Art

U.S. Pat. No. 4,275,915 discloses a motor vehicle with a rear deck lid. The vehicle also has a roof with laterally spaced longitudinal roof members and side windows under the longitudinal roof members. Fins adjoin the longitudinal roof members and an outer skin of the rear deck lid is arranged between the fins. The outer skin is offset relative to the vehicle roof. Upright side walls form the inner sides of the fins and extend up from the rear deck lid.

DE 40 26 518 A1 discloses a motor vehicle with air inlets formed in sections of the C pillars situated above a belt line. The air inlets lead via an air duct to air outlet openings that open above a tailgate.

FR 25 75 127 A1 discloses an air deflection device with a rear spoiler arranged on a rear deck lid. A frame-type air deflection element is disposed upstream of the rear spoiler and has openings in lateral areas to divert an air flow from the side wall of the body in the direction of the rear spoiler.

DE 101 43 867 A1 and other prior art show motor vehicles with openings in the rear deck lid to supply air supply air to a driving engine under the rear deck lid.

DE 30 17 919 discloses a motor vehicle with air inlets in sections of the C pillar above a belt line of the vehicle. The air inlets lead within the side wall of the motor vehicle to a cooling device.

It is an object of the invention to optimize a motor vehicle of the type described above.

SUMMARY OF THE INVENTION

The invention relates to a vehicle with an air duct that has air inlet and air outlet openings disposed so that air from the air inlet opening flows through the air outlet opening and is guided over the outer skin of the lid. Part of the air flow preferably is diverted to supply air to an assembly, such as an engine and another part of the air flow is guided for optimum incident flow to a rear air deflection device. The air outlet opening may be situated on an inner side of a fin. Thus, the air duct can supply necessary air for the assembly and for the air deflection device to develop an optimum effect when the motor vehicle is in operation even on motor vehicles with fins. The invention is especially effective if the assembly is arranged under the outer skin of the lid. The assembly preferably is the driving engine of the motor vehicle. However, the air duct also can supply some other assembly of the motor vehicle with the necessary air flow via at least one supply air inlet on the outer skin of the lid. This assembly could be a cooling device or the like. The assembly supplied with air also could be a power supply device of the motor vehicle, such as a battery or the like. These advantages can also be achieved with a rear deck lid for a motor vehicle.

Two supply air inlets may be formed on the outer skin of the lid. For example, a first supply air inlet may feed process air, e.g. combustion air for a driving engine, and a second supply air inlet may feed air for purging the compartment in which the driving engine is arranged.

The rear air deflection device may be a rear spoiler and the air ducting of the invention may be configured to supply the rear spoiler with an optimized air flow. Lateral air inlet openings have a positive effect on the pressure conditions in the rear area of the vehicle and achieve a better downforce at the rear axle of the motor vehicle.

The air duct preferably is at least partly transparent, at least sectionwise. The fins and hence the air ducts in the fins are situated above the belt line. Thus, a driver can look obliquely rearward out of the interior of the vehicle through the air duct that is partially transparent, at least in part, and vision of the driver of the vehicle is improved. Vision especially is improved if the air duct adjoins the side window by means of a duct wall. For example, at least the air duct wall adjoining the side window is at least partially transparent, at least in part or sectionwise.

The rear deck lid preferably has an approximately upright side wall in addition to the outer skin of the lid. The side wall starts from the outer skin of the lid and forms the inner side of the fin. Additionally, the side wall has the air outlet opening. Hence, the otherwise customary path of the seals on motor vehicles with a tailgate can be retained in a simple manner and there is no need to relocate this path into the area of the fins or the like.

The air duct may be a one- or multi-piece component. The air duct may continue from the air inlet opening and may end at the air outlet opening. Thus, the air supply can be provided in a simple manner, especially when the air outlet opening is part of the side wall of the rear deck lid.

The motor vehicle preferably has a mid-engine or rear-engine configuration.

The invention will be explained in greater detail below by means of illustrative embodiments, with reference to the drawing.

DETAILED DESCRIPTION OF THE PREFERRED EMBODIMENT

Figure 1:
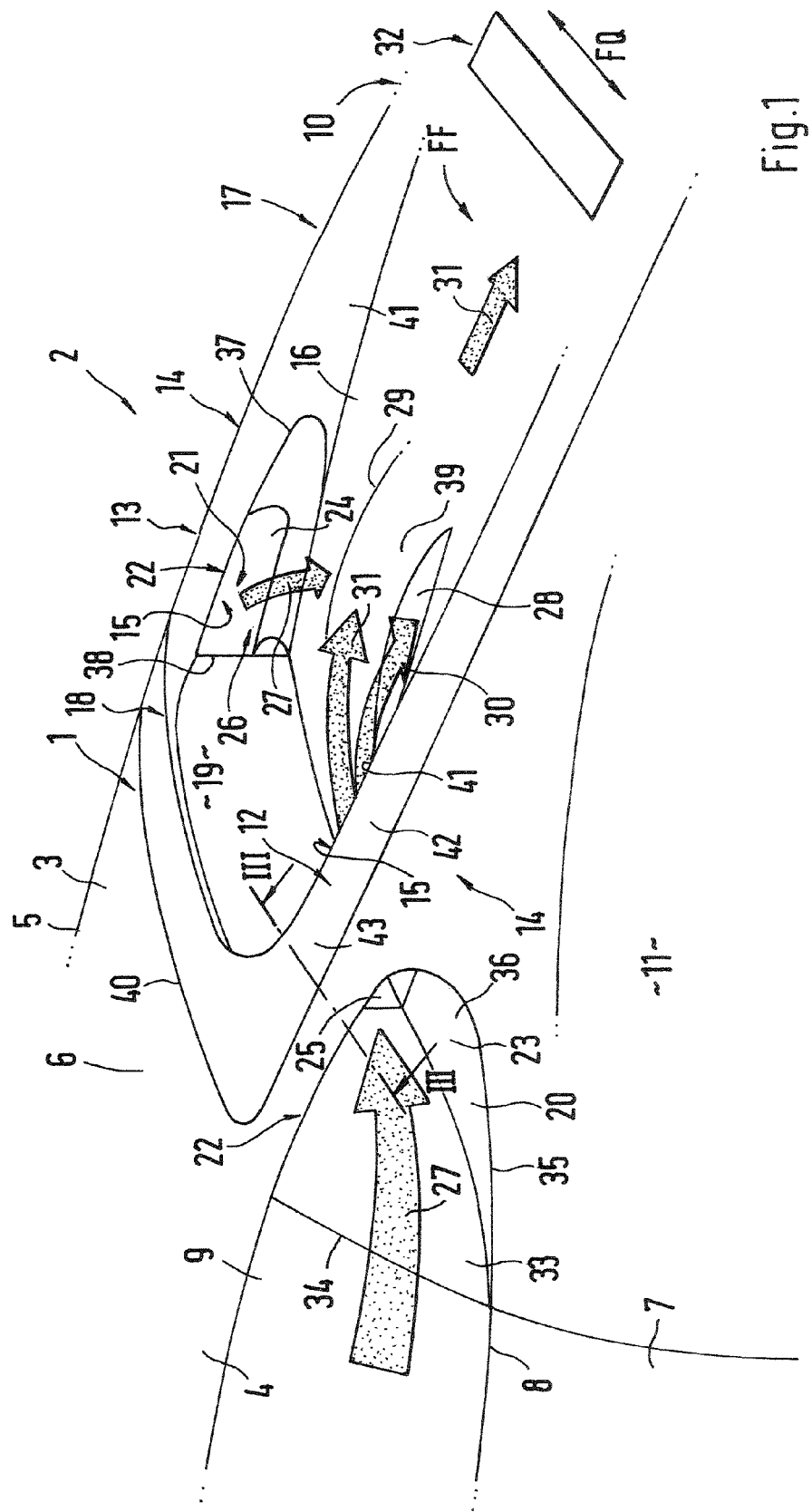
FIG. 1 is a perspective view taken from the left rear of a motor vehicle and showing a vehicle roof, fins and a rear deck lid.

FIG. 1 shows part of a body 1 of a motor vehicle 2. The body 1 includes a vehicle roof 3 with two laterally spaced longitudinal roof members 4 and 5 and a roof panel 6 therebetween. The body 1 also has a side door 7 with a side window 9 above a belt line 8 of the body 1. The side window 9 thus is situated under the longitudinal roof member 4. The vehicle 2 also has a rear end 10 and a rear side wall 11 continues from the side door 7 toward the rear end 10 of the vehicle 2.

Fins 12 and 13 extend from the two longitudinal roof members 4 and 5 toward the rear 10 of the vehicle 2. Each fin 12, 13 defines a body section disposed above the belt line 8 and, in plan view, defines a strip-shaped extension of the respective longitudinal roof member 4, 5. The height of each fin 12, 13 decreases toward the rear 10 of the vehicle 2 so that each fin 12, 13 is approximately triangular in side view. Each fin 12, 13 has an outer side 14 and an inner side 15. The inner sides 15 are spaced from one another in the transverse direction FQ of the vehicle, and an outer skin 16 of a rear deck lid 17 extends between the inner sides 15. The outer skin 16 of the lid 17 is offset relative to the vehicle roof 3 to define a step 18 between the outer skin 16 of the lid 17 and the roof panel 6 of the roof 3. A rear window 19 is arranged in the step 18. In the embodiment shown, the rear window 19 is approximately upright and extends vertically between the outer skin 16 of the lid 17 and the vehicle roof 3. The rear window 19 can be part of the body 1, i.e. attached in a fixed manner thereto, or part of the rear deck lid 17.

An air inlet opening 20, 21 of an air-ducting device 22 is provided on at least one outer side 14 of the fin 12 and/or 13. In the illustrated embodiment, each fin 12, 13 has an air inlet opening 20, 21 arranged adjacent to the respective side window 8. An air duct 23, 24 adjoins each air inlet opening 20, 21 and extends inwardly to an air outlet opening 25, 26 on the inner side 15 of the respective fin 12, 13. The air-ducting devices 22 guide an air flow 27 from each side of the vehicle into the area between the fins 12, 13. The air flows 27 that have passed through the air inlet openings 20, 21, the air ducts 23 or 24 and the respective air outlet opening 25, 26 flows over the outer skin 16 of the lid 17 in the direction of the rear 10 of the vehicle 2.

At least one supply air inlet 28 is formed on the outer skin 16 of the lid 17 downstream of the air outlet opening 25, 26. The supply air inlet 28 leads to a compartment RA (FIG. 3) for an assembly (not shown) under the outer skin 16 of the lid 17. The illustrated embodiment has two supply air inlets 28, 29 assigned respectively to the air outlet openings 25, 26 and disposed in the respective air flows 27. The two supply air inlets 28, 29 are spaced apart in the transverse direction FQ of the vehicle 2 and are close to the rear window 19. Part of the air flow 27 will enter through the respective supply air inlets 28, 29 as supply air flow 30 and will flow into the compartment RA for the assembly (not shown) disposed under the lid 17. A part of the respective air flow 27 that is not diverted into the supply air inlet 28 defines an incident flow 31 that flows across the outer plate 16 of the lid in the direction of the rear 10 of the vehicle 2 and to a rear air deflection device 32 of the motor vehicle 2. The same applies mutatis mutandis to the air-ducting device 22 associated with the right side of the vehicle 2, which has air outlet opening 24. However, the supply air flow and the incident flow are not illustrated for the right side of the vehicle 2. The air deflection device 32 is situated behind or downstream of the supply air inlet 28, 29 and can be mounted on the outer skin 16 of the lid or downstream on some other part of the body 1. A flowing guide surface FF for the incident flow 31 is defined along the outer skin 16 of the lid 17 between the supply air inlet 28, 29 and the air deflection device 32.

The rear air deflection device 32 is a rear spoiler that can be arranged on or behind the rear deck lid 17. The rear air deflection device 32 can be fixed, retractable and extendable and/or adjustable in terms of slope. The incident flow 31 diverted from the respective air flow 27 to the rear air deflection device 32 can be optimized, even though the air flow over the vehicle roof 3 can be disturbed by the step 18.

A duct wall 33 of the air duct 23 directly adjoins the side window 9, as shown in FIG. 1. The air inlet opening 20 therefore is bounded by the rear edge 34 of the side window 9 and a cutout 35 in the body side wall 11 above the belt line 8. At least part of the duct wall 33 can be at least partially transparent so that a driver can look obliquely rearward out of the interior of the vehicle through the duct wall 33. The remaining duct wall 36 of the air duct 23 also could be at least partially transparent, at least sectionwise. In a preferred embodiment, the duct wall 33 is at least partially transparent between the air inlet opening 20 and the air outlet opening 25, while the remaining duct wall 36 is opaque. The same applies analogously to the air inlet opening 21 and the air duct 24.

The air outlet opening 26 is bounded by a cutout 37 on the inner side 15 of fin 13 and by an upright lateral edge 38 of the rear window 19. The air inlets 28, 29 are arranged in a raised portion 39 formed on the outer skin 16 of the lid 17. The supply air inlets 28, 29 thus open in the direction of the air outlet openings 25, 26, allowing the supply air flow 30 to flow into the respective supply air inlet 28, 29 in a particularly favorable manner.

In the illustrated embodiment shown, the rear deck lid 17 is fit into a body cutout 40 that extends beyond the respective body side wall 11 and into the vehicle roof 3. Thus, approximately upright side walls 41 extend up from the opposite sides of the outer skin 16 of the rear deck lid 17 and form the inner sides of the fins 12, 13. The air outlet openings 25, 26 and the cutouts 37 are formed in the upright walls 41. The upright side walls 41 merge into a U-shaped frame section 43 formed by the upper sides 42 of the fins 12, 13 and the roof panel 6.

Figure 2:
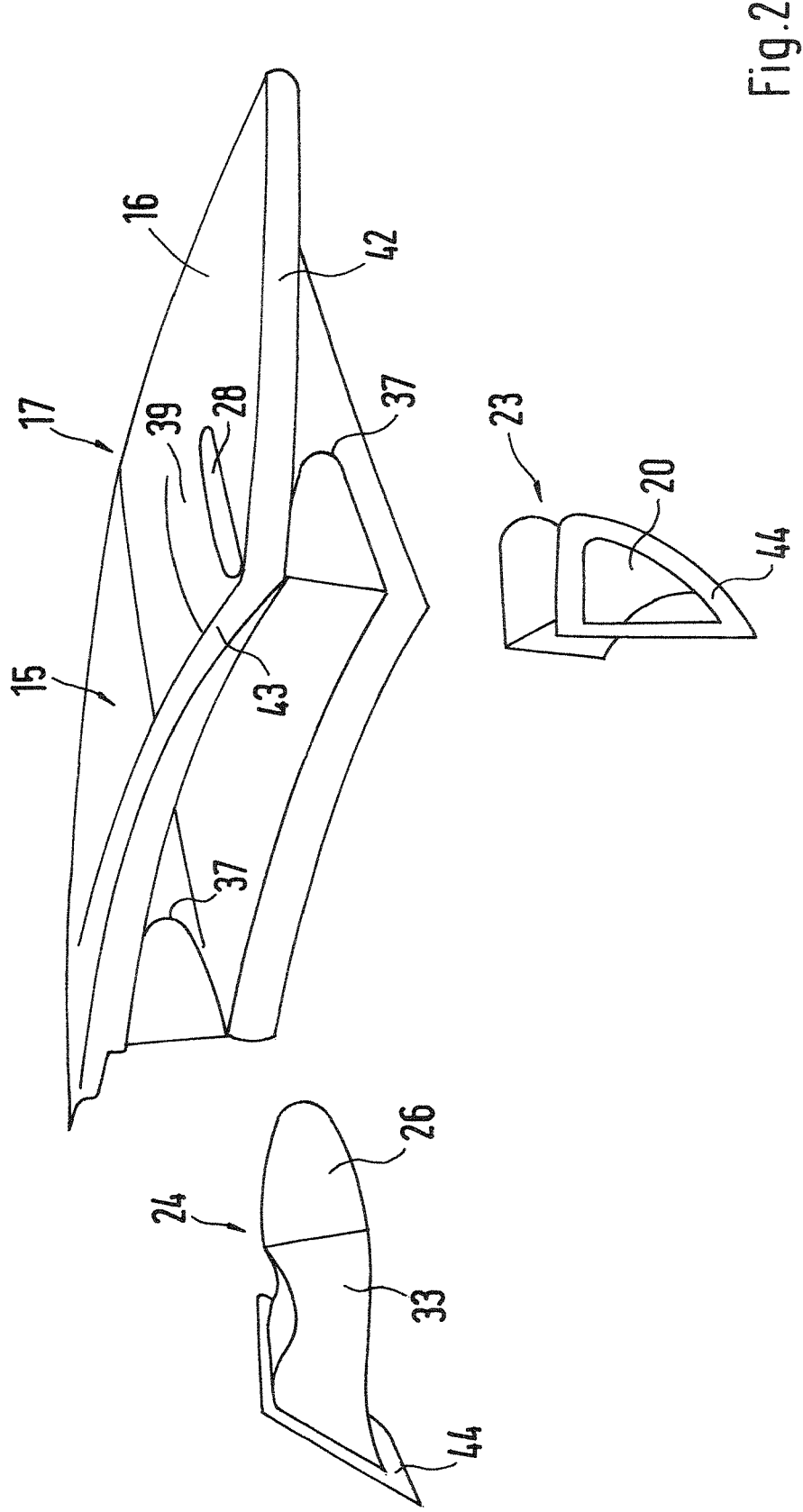
FIG. 2 shows the rear deck lid and air ducts in a detail view.
Figure 3:
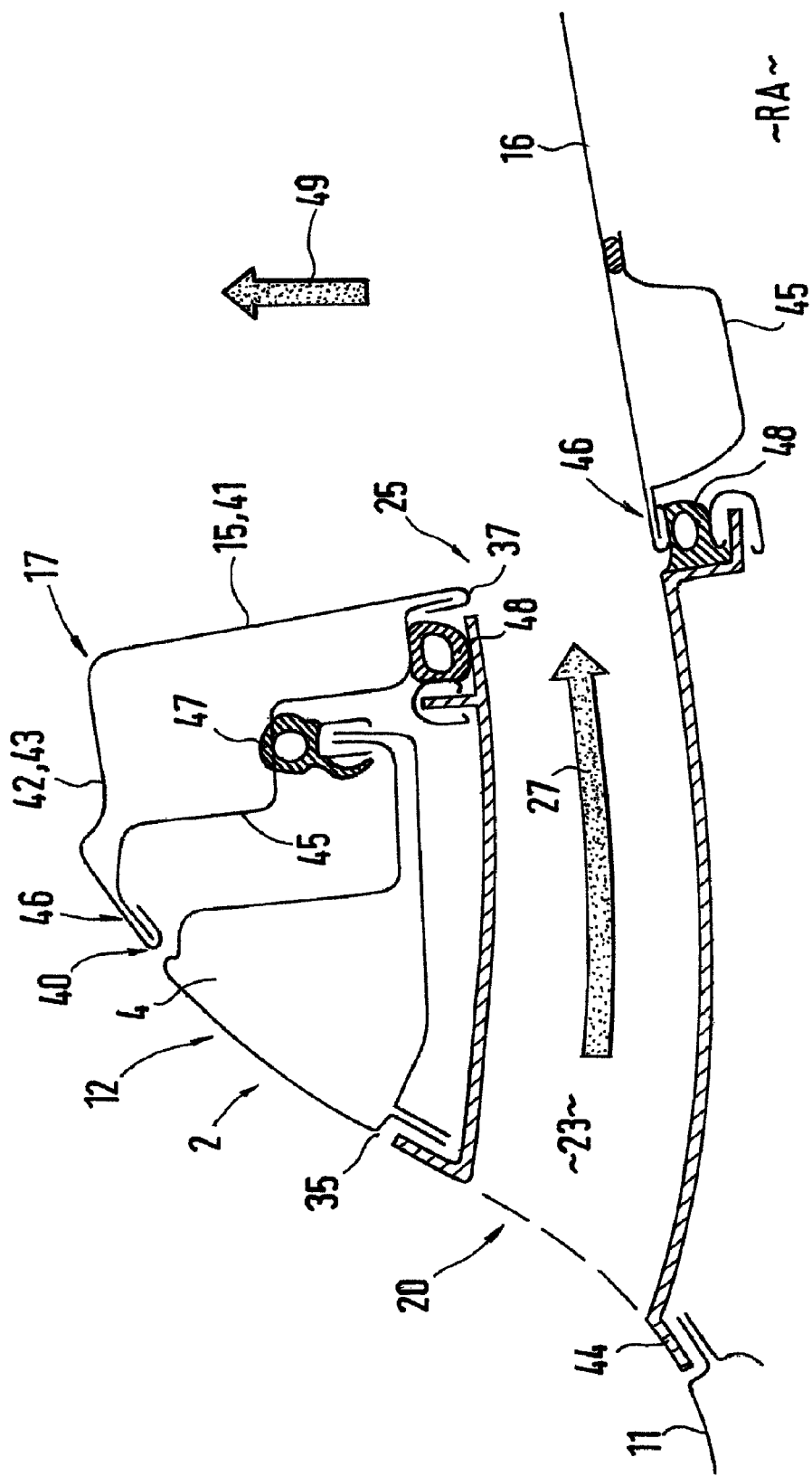
FIG. 3 shows a section along the line in FIG. 1.

As FIG. 2 shows, the air ducts 23 and 24 can be one-piece or multi-piece subassemblies, and preferably are formed from plastic. Flanges 44 extend continuously around the air ducts 23, 24 at the air inlet openings 20, 21, as shown in FIG. 3. Each flange 44 rests against the body 2 of the motor vehicle 1. The cross section of the air duct 23, 24 can be of any desired design, e.g. angular or circular. As depicted in the illustrated embodiment, the air duct 23, 24 widens downstream in a funnel shape from the inlet opening 20, 21 to the respective air outlet opening 25, 26. The cross section can be constant or can vary. In particular, the cross section is semicircular or corresponds approximately to half an oval or ellipse in regions near the outlet and inlet openings. Parts that are the same or have the same action are provided with the same reference signs in FIGS. 1 through 3. The rear deck lid 17 has the outer skin 16, the upright side walls 41 and the upper side 42 of the peripheral frame 43. The rear deck lid 17 is a twin-shell component comprising the outer skin 16 and an inner plate 45, which are joined in their edge region 46. The longitudinal roof member 4 and fin 12 also are shown in section and are designed as hollow profiles that form sections of the body cutout 40. A first lid seal 47 is mounted on the periphery of the body cutout 40 at a position between the inner plate 45 of the lid 17 and fin 12 and the longitudinal roof member 4. A further seal 48 seals the cutout 37 on the inner side 15 of fin 12 with respect to air duct 23. The rear deck lid 17 rests on the seals 47 and 48 in the closed position shown in FIG. 1, but can be lifted off from the seals 47 and 48 to open the lid 17. In particular, the lid 17 can be moved by means of a pivot (not shown) adjacent to the vehicle roof 3 to achieve the upward opening motion indicated by an arrow 49 in FIG. 3.

What is claimed is:
1. A motor vehicle with a vehicle roof having two laterally spaced longitudinal roof members, side windows under the respective longitudinal roof members, fins rearward of the side windows and defining extensions of the longitudinal roof members, and a rear deck lid arranged between the fins, the rear deck lid having an outer skin, an air inlet opening formed on an outer side of at least on one of the fins and substantially adjacent to the side window, the air inlet opening being connected by an air duct to an air outlet opening on an inner side of the fin and substantially adjacent to the outer skin of the lid, the outer skin of the lid having at least one supply air inlet for an assembly of the motor vehicle, and wherein a rear air deflection device is arranged behind the supply air inlet.

2. The motor vehicle of claim 1, wherein the assembly is a driving engine arranged under the outer skin of the lid.

3. The motor vehicle of claim 1, wherein two supply air inlets are formed on the outer skin of the lid.

4. The motor vehicle of claim 1, wherein the rear air deflection device is a rear spoiler.

5. The motor vehicle of claim 1, wherein the air duct is at least partially transparent.

6. The motor vehicle of claim 5, wherein the air duct has a duct wall that substantially adjoins the side window.

7. The motor vehicle of claim 1, wherein the rear deck lid has an approximately upright side wall that extends from the outer skin of the lid and forms the inner side of the fin, and wherein the side wall has the air outlet opening.

8. The motor vehicle of claim 1, wherein the air duct is formed by a one-piece or is multi-piece component.

9. The motor vehicle of claim 1, wherein the assembly is a mid-engine or rear engine in the motor vehicle.

10. A rear deck lid for a motor vehicle, the motor vehicle having a vehicle roof with two laterally spaced longitudinal roof members, side windows under the longitudinal roof members and fins extending rearward from the longitudinal roof members, the rear deck lid being arranged between the fins and comprising: an outer skin; upright side walls extending up from the outer skin and defining inner sides of the fins, at least one of the inner sides having an air outlet opening, at least one supply air inlet formed in the outer skin of the lid and communicating with an assembly of the motor vehicle, a flow deflection surface formed on the outer skin downstream of the supply air inlet, the flow deflection surface being configured for directing an incident flow to a rear air deflection device of the motor vehicle.

11. A motor vehicle, comprising: a vehicle roof, two laterally spaced fins extending rearward of the vehicle roof, air ducts extending respectively through the fins, each of the air ducts having an air inlet opening formed on an outer side of the respective fin and an air outlet opening formed on an inner side of the respective fin, a rear deck lid arranged between the fins and having an outer skin, the outer skin of the lid having at least one supply air inlet communicating with a compartment for an assembly of the motor vehicle that requires cooling, a rear air deflection device behind the supply air inlet.

12. The motor vehicle of claim 11, wherein the assembly is a driving engine arranged under the outer skin of the rear deck lid.

13. The motor vehicle of claim 11, wherein two supply air inlets are formed on the outer skin of the lid.

14. The motor vehicle of claim 11, further comprising a flow deflection surface formed on the outer skin downstream of the supply air inlet, the flow deflection surface being configured for directing an incident flow to the rear air deflection device of the motor vehicle.

15. The motor vehicle of claim 14, wherein the rear air deflection device is a rear spoiler.

* * * * *